Jan. 19, 1960
M. E. HODGES ET AL
2,922,109
ELECTRIC PHASE DISCRIMINATOR
Original Filed Nov. 19, 1954
2 Sheets-Sheet 1
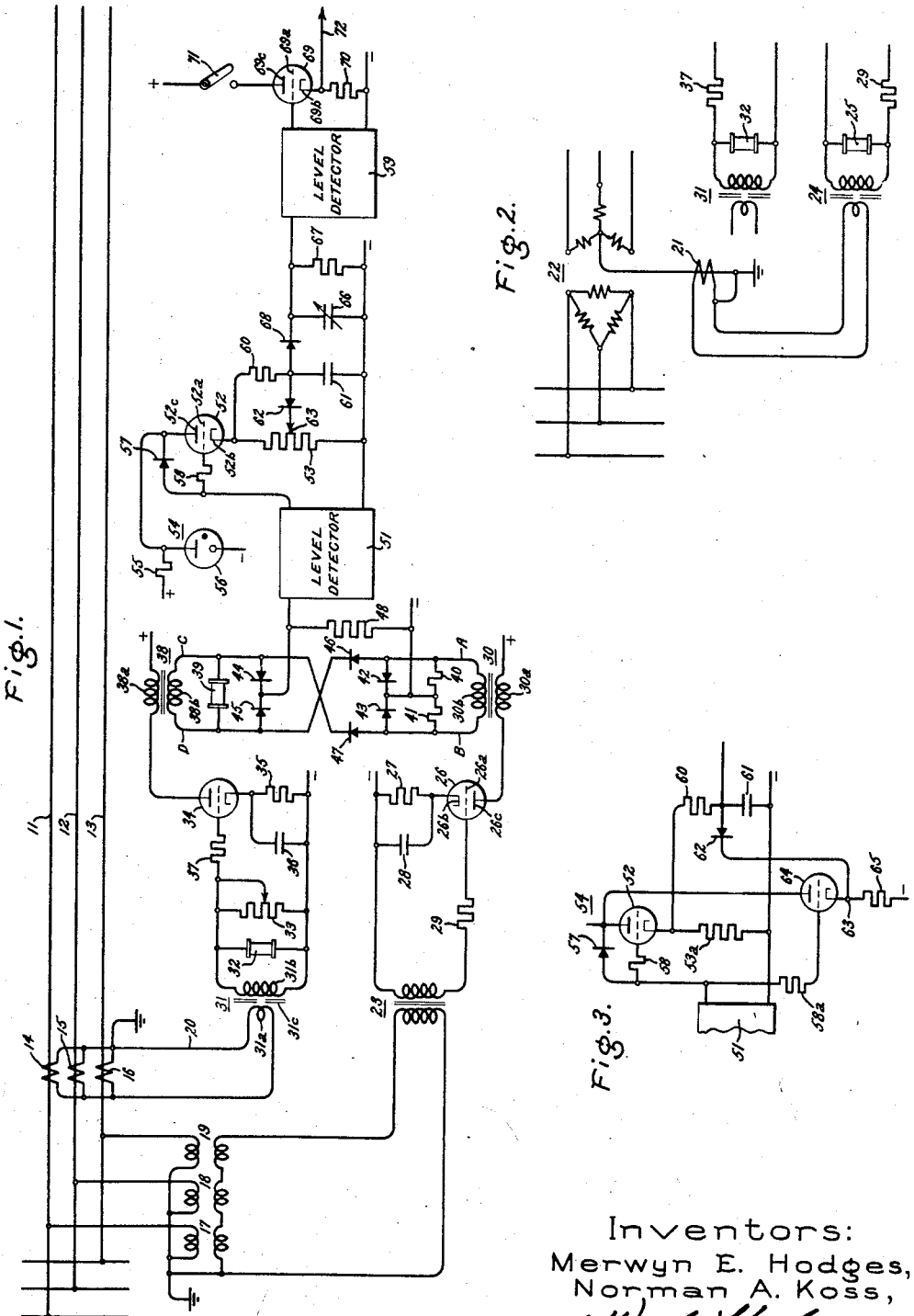
Inventors:
Merwyn E. Hodges,
Norman A. Koss,
by J Wesley Henlein
Their Attorney.

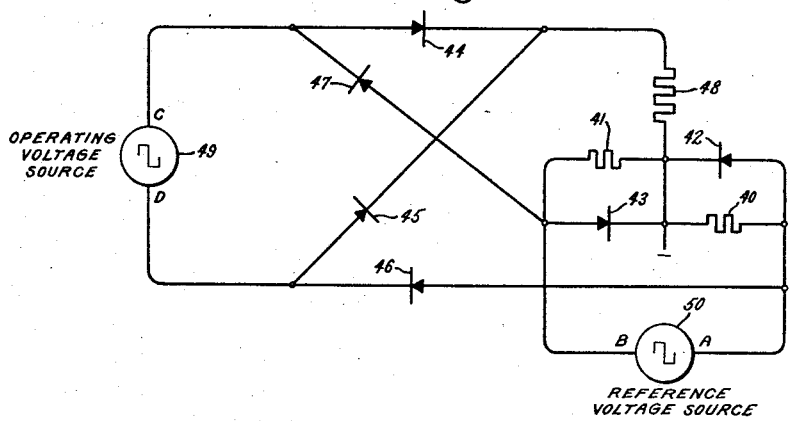
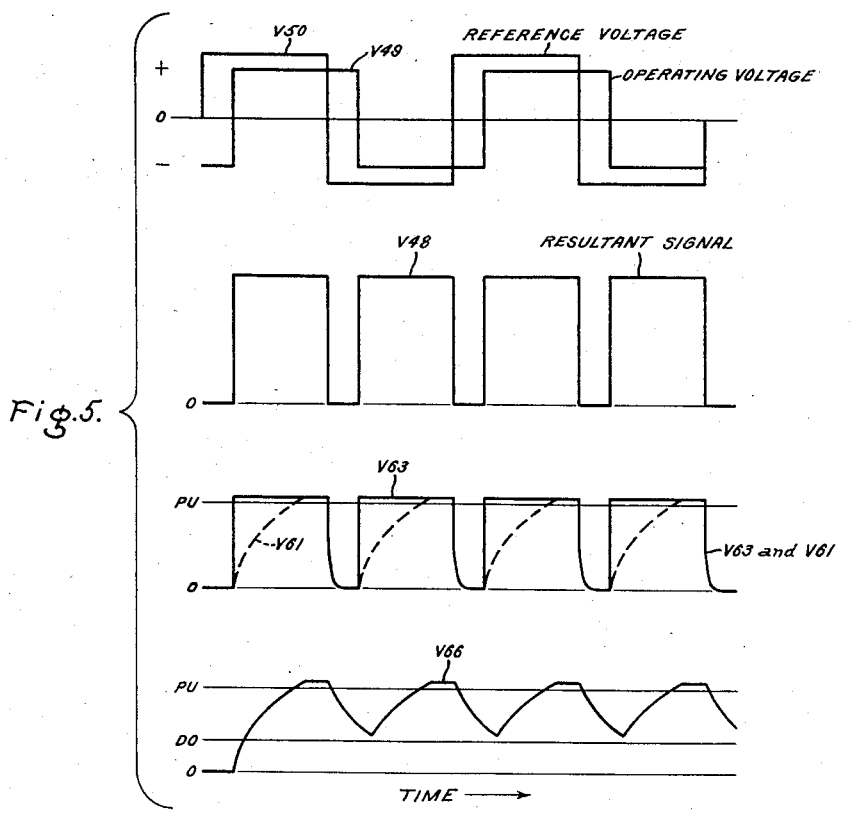

United States Patent Office 2,922,109
Patented Jan. 19, 1960

2,922,109
ELECTRIC PHASE DISCRIMINATOR

Merwyn E. Hodges, Philadelphia, and Norman A. Koss, Havertown, Pa., assignors to General Electric Company, a corporation of New York Original application November 19, 1954, Serial No. 469,947, now Patent No. 2,879,453, dated March 24, 1959. Divided and this application December 30, 1957, Serial No. 705,962

15 Claims. (Cl. 324—87)

This invention relates to an electric phase discriminator, and more particularly it relates to a circuit that is sensitive to the phase relationship between two alternating electric quantities.

This application is a division of a copending patent application S. N. 469,947, Merwyn E. Hodges and Norman A. Koss, filed on November 19, 1954, and assigned to the present assignee, said application issuing on March 24, 1959, as Patent No. 2,879,453.

In the art of high-speed protective relaying today, there is need for a convenient, reliable and accurate circuit capable of producing a single resultant voltage signal which is indicative of the phase relationship between two separate alternating electric quantities. Such a circuit is known as a phase discriminator, and it is a general object of this invention to provide an improved circuit of this character.

A phase discriminator has many applications. When combined with a suitable timing circuit or the like for indicating when the phase relationship between the two electric quantities is within predetermined limits, the discriminator is particularly useful in relay circuits such as, for example, those disclosed and claimed in Patent 2,879,454, Hodges, Koss and Seeley, issued on March 24, 1959, or in the above-mentioned parent application, now Patent 2,879,453.

A further object of the present invention is the provision of an improved timing circuit for producing an output control signal in response to any discrete discriminator voltage signal of at least a predetermined duration and for quickly resetting at the end of each discrete signal.

Still another object of the invention is to provide a timing circuit capable of producing a continuous output control signal in response to a succession of input signals each being of at least a predetermined duration when the intervals between successive input signals is less than a predetermined amount.

It is another object to provide a general purpose phase discriminator which will operate consistently and with great accuracy.

In carrying out our invention in one form, we provide a phase discriminator comprising a plurality of half-wave rectifying means or elements connected to form the respective sections of a full-wave rectifier having alternating and direct current terminals. The alternating current terminals are connected to a source of alternating operating voltage of predetermined amplitude, and impedance means is connected between the direct current terminals of the rectifier. In series relationship with each of two rectifier sections connected to a common direct current terminal we provide another pair of half-wave rectifying means or elements respectively arranged to block the normal flow of current in these sections, and a suitable shunting circuit is connected in parallel with each of the blocking rectifying elements. An alternating reference or polarizing voltage of greater than the aforesaid predetermined amplitude is applied across the blocking rectifying elements so as to render these elements alternately conductive and non-conductive. During each half cycle of polarizing voltage the blocking element that is conducting current in its forward direction is rendered ineffective to block the flow of a lesser amount of current in the normal direction in the associated rectifier section, and if the operating voltage is of appropriate polarity at any time during this half cycle, direct current will flow through the impedance means thereby producing a resultant voltage signal across said impedance. Consequently, the duration of the resultant voltage signal during each half cycle indicates the phase relationship between the alternating operating and polarizing voltages.

In one aspect of our invention, the resultant voltage signal of the phase discriminator is supplied to a time interval detecting circuit which accurately measures the duration of each successive signal. The time interval detecting circuit may be used in conjunction with a level detector or other suitable device which responds to direct voltage of at least a predetermined pickup level to produce an output control signal of predetermined constant characteristics, and which maintains said output control signal until the direct voltage is reduced below a predetermined dropout level. The time interval detecting circuit comprises voltage dividing means across which the phase discriminator resultant signal is applied, and an energy storing circuit including a first capacitor is connected to be charged to the aforesaid predetermined pickup magnitude of voltage by any resultant signal of greater than a predetermined duration. Means including a half-wave rectifier are provided to connect the capacitor to a portion of the voltage dividing means for limiting the voltage across the capacitor to a predetermined maximum level slightly above the pickup magnitude and to provide a path for rapidly discharging the capacitor at the end of each resultant signal. In order to maintain the voltage supplied to the level detector above the aforesaid predetermined dropout level for at least a predetermined interval of time following each resultant signal, thereby sustaining the output control signal for as long as the gaps between successive resultant signals are less than said predetermined interval of time, we connect the aforesaid capacitor to the input circuit of the level detector by means of a second half-wave rectifier and a second energy storing circuit including a second capacitor of small capacitance value relative to the first capacitor. The second half-wave rectifier is arranged to permit simultaneous charging of the first and second capacitors while preventing discharging of the second capacitor through the discharge path of the first capacitor, and a separate discharging circuit for the second capacitor is provided having a time constant selected to maintain voltage greater than the aforesaid predetermined dropout level for said predetermined interval of time.

Our invention will be better understood and further objects and advantages will be apparent from the following description taken in conjunction with the accompanying drawings, in which Fig. 1 is a schematic circuit diagram of a directional relay which embodies a preferred form of our invention; Fig. 2 is a fragmentary schematic circuit diagram of an alternative arrangement for obtaining a polarizing quantity for the directional responsive relay of Fig. 1; Fig. 3 is a fragmentary schematic diagram of an alternative arrangement for the time interval detecting circuit of the directional responsive relay; Fig. 4 is a simplified schematic circuit diagram of the phase discriminator component of the directional responsive relay; and Fig. 5 is a family of curves drawn to the same time scale representing the wave forms of various voltages appearing in the phase discriminator and in the time interval detecting circuit of our invention.

In order to illustrate a preferred embodiment of our invention, we have shown in Fig. 1 a high-speed relay that is responsive to the direction of ground current in a high-voltage transmission line. The illustrated 3-phase transmission line, which is represented by conductors 11, 12 and 13, may be of the type employed in an electric power system to transmit 3-phase alternating current of power frequency, such as 60 cycles per second, at very high voltage, e.g., 330,000 volts phase-to-phase. It may be assumed for the purposes of this description that the directional responsive relay is required to produce an output control signal whenever the ground current in the transmission line is flowing in a direction from left to right as viewed in Fig. 1.

The ground current directional relay, which has been fully described and claimed in the above-mentioned parent application, now Patent 2,879,453, is coupled to the transmission line conductors 11–13 by means of three instrument current transformers 14, 15 and 16 and three instrument potential transformers 17, 18 and 19. The secondary circuits of the current transformers are Y-connected, and the residual circuit 20 of these transformers carries current that is directly proportional to the ground current flowing in the transmission line. As shown in Fig. 1, the potential transformers are connected Y-open-delta, and the voltage across the broken delta secondary connection represents the zero sequence voltage of the transmission line.

The ground current directional relay determines if ground current is flowing toward the right, as viewed in Fig. 1, by comparing the phase angle between two alternating electric quantities supplied to it whenever ground current is flowing in the power system. One of the two electric quantities will be called the "operating quantity" and comprises the current in the residual circuit 20 of current transformers 14, 15 and 16. The other quantity will be called the reference or polarizing quantity and can comprise either zero sequence voltage taken from the broken delta connection of the secondary windings of potential transformers 17, 18 and 19, as shown in Fig. 1, or, in the alternative, current taken from a transformer 21 coupled to the neutral connection of a grounding transformer bank 22, as shown in Fig. 2. The choice of either voltage or current polarizing quantity is one of convenience and economics and depends upon the availability of a grounding bank neutral connection in the particular power system. The directional relay uses the phase angle between residual current and polarizing quantity to determine whether the residual current, and thus the ground current, is flowing toward the right or toward the left.

Consider first the reference or polarizing channel of the illustrated directional relay. The alternating zero sequence voltage is supplied to suitable transforming means such as the iron-core transformer 23 illustrated in Fig. 1. Transformer 23 derives a polarizing voltage representative of the zero sequence voltage both in magnitude and phase while insulating succeeding relay circuits from the potential transformer connections.

In the alternative arrangement shown in Fig. 2, wherein grounding transformer bank 22 neutral current is used as the polarizing quantity, transformer 21 is connected to suitable transforming means 24 which, for the purposes of the illustrated embodiment of our invention, preferably is similar to transforming means 31 to be described more fully hereinafter. Transforming means 24 derives a polarizing voltage which is representative of the neutral current both in magnitude and phase. It is possible that during severe unbalanced transmission line short circuit or fault conditions an extremely large voltage may be induced in the secondary winding of transforming means 24. To prevent injury to the insulation of this winding and to protect the succeeding relaying components which might otherwise be damaged by such a large voltage, a voltage limiter 25 is connected across the secondary winding of transforming means 24.

The voltage limiter 25 has a non-linear current-voltage characteristic, that is, the ohmic value of the limiter decreases with increasing voltage applied across it so that current increases at a greater rate than voltage. Many such non-linear current-voltage characteristic devices are known in the art, and for the purposes of the illustrated embodiment of our invention we prefer at present to use a special ceramic resistance material comprising silicon carbide crystals held together by a suitable binder, such as described and claimed in U.S. Patent 1,822,742, issued to Karl B. McEachron on September 8, 1931. Limiter 25 provides means for increasing the secondary load current of transforming means 24 as the secondary voltage increases, thereby limiting the maximum possible peak value of secondary voltage to a safe level without interfering with measurement accuracy at the normally smaller values of voltage.

The polarizing voltage derived by transforming means 23 (or 24) serves as a control signal for a squaring amplifier 26. The squaring amplifier is employed to shape the alternating polarizing voltage into rectangular wave form. Although we do not wish to be limited thereto, the preferred form of squaring amplifier, as shown in Fig. 1, comprises a high-mu triode vacuum tube 26 which changes from cutoff to full conduction in response to only a very small change in the voltage level of its grid 26a. To permit symmetrical operation of the amplifier, a parallel resistor 27-capacitor 28 element is connected between the cathode 26b of tube 26 and negative bus represented by the symbol (—). (The symbols (+) and (—) are used throughout the drawings to represent the positive bus and negative bus respectively of a unidirectional supply voltage source, such as a battery, which has not been shown for the sake of drawing simplicity.) The parallel resistor-capacitor element establishes the average cathode potential at a positive level whereby a grid voltage of zero volts with respect to negative bus lies halfway between the values of grid voltage required for cutoff and for full conduction. The cathode heater and heater circuit of tube 26, being well known to those skilled in the art, have been omitted for the sake of drawing simplicity.

The polarizing voltage is applied between negative bus and the grid 26a of tube 26. A grid resistor 29 limits grid current whenever the grid 26a is positive with respect to cathode 26b. Transformer coupling is provided in the plate circuit of tube 26. A primary winding 30a of an iron core transformer 30 is connected between plate 26c and positive bus. As long as no voltage is applied to grid 26a, tube 26 is conducting quiescent current of relatively constant magnitude. Whenever polarizing voltage is applied to grid 26a, the tube will conduct increasing current during approximately the entire period of each positive half cycle of polarizing voltage and decreasing current during the period of each negative half cycle, and an alternating, substantially square wave polarizing or reference voltage signal will be induced in transformer secondary winding 30b. The amplitude of the polarizing voltage signal is independent of the magnitude of the polarizing quantity which produced it, but the voltage signal has a fixed phase relation to the polarizing quantity, i.e., positive and negative half cycles of the square wave polarizing voltage signal have a fixed time relationship to the positive and negative half cycles of zero sequence voltage or, in the alternative, of grounding bank neutral current.

Consider now the operating channel of the directional relay. The residual circuit 20, as shown in Fig. 1, is connected to suitable transforming means 31 which, for the purposes of the illustrated embodiment of our invention, preferably comprises primary and secondary windings 31a and 31b, respectively, and an iron core 31c which has an air gap. Transforming means 31 operates to derive a voltage representative of the residual current both in magnitude and phase over the operating range of current values while imposing minimum burden on the current transformers 14—16. The magnitude of voltage across secondary winding 31b and the phase angle by which it leads the current in primary winding 31a is determined by the amount of load in the secondary circuit. Open circuit secondary voltage leads the primary current by 90 electrical degrees. Due to the high percentage of total primary current used for magnetizing the iron, initial transient D.-C. offset in the current wave form upon the occurrence of a transmission line fault will not be appreciably reproduced in the secondary voltage. The transforming means 31 also serves as a desirable means for insulating succeeding relay circuits from the current transformer connections. A voltage limiter 32 is provided, as was the case for limiter 25 described above, to limit the maximum possible peak value of induced voltage to a safe level.

For the voltage polarized arrangement illustrated in Fig. 1, a rheostat 33 is provided to load the transforming means 31 thereby to shift the phase relationship of the derived voltage with respect to the residual current. Rheostat 33 is adjusted so that the derived operating voltage leads the residual current by 60 electrical degrees. This is desirable for reasons that will become apparent below. For the current polarized arrangement, as shown in Fig. 2, the rheostat is omitted and the operating voltage derived by transforming means 31 is representative of the phase of the residual current as in the case of transforming means 24.

The operating voltage serves as a control grid signal for another squaring amplifier 34. This device preferably is the same as amplifier 26 used to square the polarizing voltage, and, as described above, includes a high-mu triode vacuum tube 34, a parallel resistor 35-capacitor 36 element for biasing the cathode, a grid resistor 37, and a primary winding 38a of a transformer 38 connected in the plate circuit. The transformer secondary winding 38b produces an alternating, substantially square wave operating voltage signal having independent amplitude but fixed phase relation to the residual current.

With the various transformers connected as shown in Figs. 1 and 2, and with ground current flowing in a direction from left to right in the transmission line, the relationship between operating and polarizing quantities is as follows: residual current is in phase with grounding bank neutral current (Fig. 2); residual current lags zero sequence voltage by sixty electrical degrees (Fig. 1). It therefore follows that in the current polarized arrangement, the operating voltage signal is substantially in phase with the polarizing voltage signal whenever ground current flows toward the right, and in the voltage polarized arrangement, due to the 60-degree phase shift established by rheostat 33, the operating voltage signal is again substantially in phase with the polarizing voltage signal whenever ground current flows toward the right. Whenever ground current flows from right to left in the transmission line, the residual current will reverse 180 electrical degrees with respect to the above relationships, and the operating voltage signal will become substantially 180 electrical degrees out-of-phase with respect to the polarizing voltage signal.

In order to develop a single resultant signal which will indicate the phase relationship between the operating and polarizing voltage signals, and thereby indicate the direction of ground current, we provide a phase discriminating circuit which will now be described. For reasons which will become apparent hereinafter, it is desirable that the amplitude of the operating voltage signal be less than the amplitude of the polarizing voltage signal, and for this reason the transformer 38 is loaded by an impedance element 39 having a non-linear current-voltage characteristic connected across secondary winding 38b. This element preferably is similar to the voltage limiter 25 described above, and it is employed to limit the operating voltage signal of transformer 38 to a value which is always less than the value of the polarizing voltage signal. By using a non-linear element, the limiting effect is greatest at peak values of voltage, and therefore the squareness of the operating voltage signal wave form is improved.

In accordance with our invention, the phase discriminator comprises two voltage dividing resistors 40 and 41 having substantially equal values of resistance, a plurality of one-way electric valves or half-wave rectifying elements 42–47, and impedance means such as a resistor 48. The polarizing and operating voltage signals are supplied to the phase discriminator which operates to develop a substantially constant magnitude resultant unidirectional voltage across resistor 48 whenever the polarizing and operating voltage signals have like polarity. With the arrangement of discriminator components particularly described below, the operating voltage will drive current through resistor 48 to produce the unidirectional voltage drop, while the polarizing voltage performs a supervising function and renders the operating voltage ineffective to produce unidirectional voltage whenever the relative polarities of these two input voltages are not the same.

As can be seen in Fig. 1, the two voltage dividing resistors 40 and 41 are connected in series circuit relationship across the transformer secondary winding 30b. Two of the half-wave rectifiers 42 and 43 are connected in series circuit opposing relationship across the pair of resistors 40 and 41, and the common point between these rectifying elements is connected to the common point between the resistors. This common point is connected to one terminal of the impedance means or resistor 48 and is also tied to the negative bus. The terminal of transformer secondary winding 30b which is connected directly to resistor 40 and rectifier 42 has been marked with the reference letter A in Fig. 1, and the opposite terminal has been marked B. Whenever terminal A is positive polarity with respect to terminal B, rectifier 42 will act as a shunt path around resistor 40, and substantially the entire polarizing voltage signal will appear across resistor 41. Similarly, whenever terminal A is negative with respect to terminal B, rectifier 43 will act as a shunt path around resistor 41 and substantially the entire polarizing voltage signal will appear across resistor 40.

A second pair of series connected opposing rectifying elements 44 and 45 are connected across the impedance element 39. The common point between these rectifiers is connected to the other terminal of resistor 48, and rectifiers 44 and 45 are arranged to permit the flow of current only in a direction toward resistor 48. The terminals of transformer secondary winding 38b corresponding to terminals A and B of secondary winding 30b have been marked by the reference letters C and D respectively. Opposite terminals of the secondary windings 30b and 38b are interconnected through the rectifying elements 46 and 47, with rectifier 46 arranged to permit current flow only in the direction from terminal A toward terminal D, and rectifier 47 arranged to permit current flow only in the direction from terminal B toward terminal C.

To understand the operation of our discriminating circuit, assume first that the operating and polarizing voltage signals have like polarities and that terminal A is negative with respect to terminal B. It necessarily follows that terminal C is negative with respect to terminal D. Due to rectifier 43, terminal B can be no more positive than negative bus and the potential of terminal B is equal to the potential of negative bus. In other words, both sides of rectifier 43 are at substantially the same potential of negative bus. Therefore it is possible for load current to flow from the relatively positive terminal D of transformer secondary winding 38b through rectifier 45 and resistor 48 to negative bus and hence through rectifiers 43 and 47 to terminal C, and a resultant unidirectional voltage is developed across resistor 48.

Although this load current appears to flow backwards through the rectifier 43, it will be observed that net current through rectifier 43 is still in its forward direction due to current from terminal B of transformer secondary winding 30b which follows this shunt path around resistor 41 and which is greater than the load current.

Next assume that the polarity of the operating voltage signal reverses with respect to the polarity of the polarizing voltage signal. Terminal A remains negative with respect to terminal B, but now terminal C is positive with respect to terminal D. As reasoned above, the potential at terminal B is equal to the potential of negative bus, and therefore terminal A is negative with respect to negative bus. Transformer 38 tends to drive current from terminal C through rectifier 44 and resistor 48 to negative bus and thence through resistor 40 and rectifier 46 to terminal D. But, in order for rectifier 46 to pass this current, terminal D must not be more positive than terminal A. Since the value of operating voltage is always of lower magnitude than the value of polarizing voltage, the potential of terminal D will be more positive than the negative potential of terminal A, even with terminal C at negative bus potential. Therefore, rectifier 46 is non-conductive and no load current can flow through resistor 48. As a result, no resultant voltage is developed.

Due to the symmetry of the phase discriminating circuit, its operation will be similar to that described above whenever terminal A is positive with respect to terminal B.

To aid in conveying a clearer understanding of our improved phase discriminator, the components and circuitry described above have been shown in simplified form in Fig. 4. Referring to Fig. 4, it will be observed that the half-wave rectifying means or elements 44–47 are arranged to form a full-wave bridge-type rectifier. A source of operating voltage 49 is connected across the alternating current terminals of the bridge-type rectifier, and the impedance means or resistor 48 is connected across the direct current terminals of this rectifier. The parallel combinations of resistor 40 and the unilaterally conductive element 42 and of resistor 41 and the unilaterally conductive element 43 are connected in the sections of the bridge-type rectifier formed by rectifying elements 46 and 47, respectively. The elements 42 and 43 are poled so as to block the normal flow of current in these rectifier sections, that is, elements 42 and 43 are arranged in series opposition with elements 46 and 47, respectively. The source of polarizing or reference voltage 50 is connected across the rectifying elements 42 and 43 as indicated in Fig. 4. It should be apparent that during successive half cycles of reference voltage first one and then the other of the rectifying elements 42 and 43 conduct biasing current, while a blocking voltage, comprising substantially the full reference voltage, is impressed across the companion element. During each half cycle of reference voltage, unidirectional current having a magnitude less than the magnitude of biasing current can be conducted between the direct current terminals of the bridge-type rectifier, and hence through resistor 48, only when the operating voltage applied to the alternating current terminals of the rectifier is of appropriate polarity.

Whenever the operating and reference voltage signals are in phase, both of the terminals A and C are positive with respect to their respective associated terminals B and D, and a continuous unidirectional resultant signal will be developed across resistor 48 of our phase discriminating circuit. Whenever the operating and reference voltages are 180 electrical degrees out of phase, no resultant signal will be developed. For each variation of phase angle between these two extremes, a discrete resultant signal or voltage impulse having a duration determined by the overlap of like polarities will be developed every half cycle. Thus the duration of the resultant signal or impulse during each half cycle indicates the phase angle between the operating and reference voltage signals and consequently indicates the phase angle between the residual current and the polarizing quantity. This is shown graphically in Fig. 5 where idealized square wave operating voltage V49 has been shown, for example, lagging idealized square wave reference voltage V50 by approximately 45 degrees. The resultant signal V48 developed by the phase discriminator comprises a succession of discrete unidirectional voltage blocks of about 135-degree duration with 45-degree intervals between blocks.

In the ground current directional relay illustrated in Fig. 1, the positive terminal of the resistor 48 is connected to a level detector 51 shown in block form. For the purposes of this specification the term level detector is used to designate a device such as an electronic switch, i.e., means responsive to an input signal of at least a predetermined instantaneous value for producing substantially instantaneously an output signal of predetermined constant characteristic. An suitable circuit can be used for level detector 51. For example, the arrangement shown in Fig. 1 of a copending patent application Serial No. 500,475, filed on April 11, 1955, by Merwyn E. Hodges and Harold T. Seeley, and assigned to the present assignee, which is described in detail and claimed therein, is particularly well suited. Such a circuit has the desirable features of extremely fast pickup and cutoff times, selectable pickup with respect to input signal level, and a high degree of accuracy which is maintained during fluctuations of supply voltage and variations of ambient temperature. Level detector 51 produces a constant magnitude unidirectional voltage substantially instantaneously in response to a low value of the resultant signal across resistor 48. The purpose of the level detector 51 is to provide amplified voltage impulses or blocks each having a magnitude which remains constant regardless of the amplitude, above the aforesaid low value, of the resultant signal from resistor 48, and each having an improved rectangular wave shape.

The output voltage of level detector 51 supplies control grid 52a of a cathode follower vacuum tube 52. Cathode 52b of tube 52 is connected through a tapped cathode resistor 53 to negative bus, while plate 52c is connected to a source of regulated positive potential 54. The source of regulated positive potential 54, as shown in Fig. 1 by way of example, comprises a resistor 55 in series circuit relationship with a cold cathode voltage regulating OA3/VR75 gas tube 56 connected between positive and negative buses. This combination is relatively insensitive to fluctuations of supply voltage, and the positive voltage of plate 52c is thereby held substantially constant. Because variations of grid voltage affect the conductance of a vacuum tube, a rectifier 57 is provided between the grid and plate circuits of tube 52 to limit the maximum magnitude of the voltage impulses produced by level detector 51 to the substantially constant value of plate voltage. A grid resistor 58 is provided to limit grid current thereby further stabilizing the operation of tube 52. As a result, cathode follower 52, in response to energization of grid 52a by the output voltage of level detector 51, provides across tapped resistor 53 a voltage drop of substantially constant magnitude regardless of the amplitude of the resultant voltage impulses from the discriminator circuit and regardless of fluctuations of supply voltage.

Another level detector 59 is connected through a time interval detecting circuit to cathode resistor 53. Level detector 59, shown in block form in Fig. 1, derives a unidirectional output voltage of constant magnitude substantially instantaneously when energized by a voltage of at least a predetermined pickup value and maintains said output voltage until the energizing voltage is reduced to less than a predetermined cutoff value. Any suitable circuit can be used for level detector 59. For example, the arrangement shown in Fig. 3 of the aforesaid copending application S.N. 500,475, filed on April 11, 1955, by Merwyn E. Hodges and Harold T. Seeley is particularly well suited.

The time interval detecting circuit controls the energization of level detector 59. This circuit measures the duration of each voltage impulse appearing across resistor 53, applies voltage of the predetermined pickup value to level detector 59 in response to a voltage impulse of at least a first predetermined duration, maintains voltage of greater than the predetermined cutoff value for at least a second predetermined length of time, and quickly resets when the applied voltage becomes less than cutoff value.

In accordance with our invention, the time interval detecting circuit, as can be seen in Fig. 1, comprises a resistor 60 and a timing capacitor 61 connected in series circuit relationship across cathode resistor 53. One terminal of capacitor 61 is connected to negative bus. A rectifier 62 is connected from the positive terminal of capacitor 61 to an adjustable slider 63 which taps a portion of resistor 53. Rectifier 62 is arranged to permit easy current flow only from the positive terminal of capacitor 61 toward slider 63.

In response to the voltage drop across resistor 53 produced by a resultant voltage impulse, charging current will flow through resistor 60 to the timing capacitor 61. The time constant of this charging circuit is selected so that capacitor 61, in parallel combination with a capacitor 66, will charge to the predetermined pickup value of voltage of level detector 59 whenever the resultant voltage impulse is maintained for a first predetermined period of time. The maximum voltage level to which capacitors 61 and 66 can charge is determined by the portion of voltage drop across resistor 53 which is tapped by slider 63. Slider 63 is adjusted so that the maximum level is only slightly greater than the pickup value of voltage. At the end of each voltage impulse, timing capacitor 61 rapidly discharges through rectifier 62 and the tapped portion of resistor 53. The voltages of slider 63 and timing capacitor 61 are shown as V63 and V61, respectively, in Fig. 5 for the particular phase relationship between operating and reference voltages that has been illustrated in this figure by way of example.

An alternative arrangement whereby timing capacitor 61 discharges even more rapidly is illustrated in Fig. 3. Another cathode follower vacuum tube 64 is employed in this modification. The grid of tube 64 is energized by the output voltage of level detector 51 through grid resistor 58a, the cathode of tube 64 is connected through a cathode resistor 65 to negative bus, and the plate is connected to the source of regulated positive potential 54. Grid resistor 58a prevents loading of the output of level detector 51 by grid current flow. Cathode resistor 65 performs the same function as the tapped portion of resistor 53 in Fig. 1. Since the value of resistance of resistor 65 can be much less than that of the tapped portion of resistor 53, while maintaining the same maximum voltage level, the time required to discharge capacitor 61 at the end of each voltage impulse is correspondingly less for the modification of Fig. 3.

Rapid discharge is of course desirable to enable timing capacitor 61 to accurately time each voltage impulse unencumbered by residual charge remaining from the immediately preceding impulse. Limiting the maximum voltage level to slightly greater than pickup value contributes to the rapid discharge feature of our circuit.

The time interval detecting circuit, as shown in Fig. 1, may include a variable holding capacitor 66 of small capacitance value relative to timing capacitor 61 in parallel circuit relationship with a resistor 67 coupled to the timing capacitor 61. One terminal of capacitor 66 is connected to negative bus and the other terminal is connected through a rectifier 68 to the positive terminal of capacitor 61. Rectifier 68 is arranged to permit capacitor 66 to charge simultaneously with capacitor 61 but to prevent discharge of capacitor 66 through the discharge path of capacitor 61. At the end of each voltage impulse, holding capacitor 66 discharges through resistor 67. The value of capacitance of capacitor 66 and the value of resistance of resistor 67 are selected whereby a second predetermined time interval is required for the voltage across capacitor 66 to decay from the maximum level to the predetermined cutoff value. The positive terminal of capacitor 66 is connected to the input circuit of level detector 59 which responds to the pickup and cutoff values of voltage as discussed above. In Fig. 5 the voltage of capacitor 66, which voltage is identified by the reference character V66, has been shown in relation to the pickup (PU) and dropout (DO) values of the level detector 59 for the particular conditions illustrated therein.

The output voltage of level detector 59 supplies control grid 69a of a final cathode follower vacuum tube 69. As can be seen in Fig. 1, cathode 69b of tube 69 is connected through a cathode resistor 70 to negative bus, while plate 69c is coupled to positive bus by means of a switch 71. Full conduction by tube 69 can obtain only when grid 69a is energized by the output voltage of level detector 59 and switch 71 is closed to connect plate 69c to positive bus. Full conduction by tube 69 develops a voltage drop across resistor 70 which provides an output control signal from a low impedance source. By means of a conductor 72 connected to the positive terminal of cathode resistor 70, this output control signal is supplied to utilization apparatus (not shown) where it may be used to initiate or perform a suitable control or protective function.

For the purposes of the illustrated embodiment of our invention, it is desirable to have the directional responsive relay produce an output control signal whenever the operating voltage signal is less than ±90 electrical degrees out-of-phase with the polarizing voltage signal. In this range the resultant voltage impulses or signals developed every half cycle by the phase discriminator are of at least 90 electrical degrees duration. Therefore, the first predetermined period of time in the time interval detecting circuit is selected to be approximately .0042 second (or 90 degrees on a 60 cycles per second basis), and the pickup value of energizing voltage for level detector 59 is not reached until a resultant voltage impulse has lasted for a duration of at least 90 degrees. As a result, an output control signal can be produced by the ground current directional relay only when the phase angle between operating and polarizing voltage signals differs from zero or the in-phase condition by 90 degrees or less, and within these limits are included all possible relationships between operating and polarizing quantities whenever ground current is flowing from left to right in the transmission line conductors 11–13.

It has been found that ground current flowing toward the right in the transmission line is substantially always within ±45 electrical degrees of the in-phase condition, and it is desirable to be able to produce a continuous output control signal whenever the operating voltage signal is less than 45 electrical degrees out-of-phase with the polarizing voltage signal. Within this range, the gaps between successive voltage impulses developed every half cycle by the phase-discriminator are of less than 45-degree intervals. Accordingly, the second predetermined time interval in the time interval detecting circuit is selected to be approximately .0028 second (or 60 degrees on a 60 cycle per second basis), and the energizing voltage for level detector 59 is continuously maintained above cutoff value whenever the gaps between resultant voltage impulses are less than approximately 45-degree durations. Fig. 5 illustrates the energizing voltage (V66) when operating voltage lags polarizing or reference voltage by 45 degrees.

While we have shown and described a preferred form of our invention by way of illustration, many modifications will occur to those skilled in the art. We therefore contemplate by the appended claims to cover all such modifications as fall within the true spirit and scope of our invention.

What we claim as new and desire to secure by Letters Patent of the United States is:

1. Phase discriminating means responsive to two separate substantially square wave alternating voltages having variable phase relationship with respect to each other comprising, two pairs of rectifying means each arranged in series circuit opposing relationship and supplied by a different said voltage, means interconnecting said pairs of rectifying means including a third pair of rectifying means arranged to conduct electric energy during periods determined by the time during which said voltages have like polarities, whereby the period of electric energy conduction indicates the phase relationship between said alternating voltages, and output means responsive to the conduction of electric energy for deriving an output voltage.

2. Discriminating means comprising, first input terminals to which substantially constant magnitude alternating reference voltage impulses are applied, separate input terminals to which substantially constant magnitude alternating operating voltage impulses having variable overlapping relation with respect to said reference impulses are applied, a first pair of one-way electric valves arranged in series circuit opposing relationship and connected to said first input terminals, a second pair of one-way electric valves arranged in series circuit opposing relationship and connected to said separate input terminals, interconnecting means connected to said first and second pairs of valves and including a third pair of one-way electric valves arranged for the transmittal of electric energy whenever a reference voltage impulse overlaps an operating voltage impulse of like polarity, said interconnecting means including output means responsive to said transmittal of energy for developing resultant output voltage impulses, and output terminals connected to said output means.

3. Discriminating means comprising, first input terminals to which are applied alternating reference voltage impulses of predetermined amplitude, separate input terminals to which are applied alternating operating voltage impulses of less than said predetermined amplitude and having variable overlapping relation with respect to said reference impulses, a first pair of rectifying means arranged in series circuit opposing relationship and connected to said first input terminals, a second pair of rectifying means arranged in series circuit opposing relationship and connected across said separate input terminals, and interconnecting means including a resistor and a third pair of rectifying means and connected between said first and second pairs of rectifying means, said third pair of rectifying means arranged to permit an operating voltage impulse to drive current through said resistor thereby producing a resultant output voltage drop across said resistor only when said operating voltage impulse overlaps a reference voltage impulse of like polarity.

4. A time interval detecting circuit comprising, a first pair of input terminals supplied by a source of substantially constant magnitude unipolarity supply voltage impulses of varying duration, a second pair of input terminals supplied by a relatively low impedance source of unipolarity reference voltage impulses having less magnitude but the same wave form as said supply voltage impulses, means interconnecting the negative one of said first and second pairs of input terminals, a first resistor having one terminal connected to the positive one of said first pair of input terminals, a first capacitor connected in series circuit relationship with said first resistor across said first pair of input terminals thereby to charge to at least a first predetermined voltage level in response to a supply voltage impulse of greater than a predetermined duration, first rectifying means interconnecting the other terminals of said first resistor and the positive one of said second pair of input terminals, said first rectifying means being arranged to limit the maximum voltage level of said first capacitor to the magnitude of said reference voltage impulses and to provide a path for rapidly discharging said first capacitor through said low impedance source of reference voltage impulses at the end of each voltage impulse, a second capacitor, second rectifying means coupling said second capacitor to said first capacitor and arranged to permit simultaneous charging of both said first and second capacitors while preventing discharging of said second capacitor through the discharging path of said first capacitor, and a second resistor connected across said second capacitor thereby to provide a path for discharging said second capacitor at the end of each voltage impulse, whereby greater than a second predetermined voltage level is maintained across said second capacitor for a predetermined interval when said second capacitor is discharged from said maximum voltage level at the end of a voltage impulse.

5. A voltage responsive circuit comprising, input terminals to which substantially constant magnitude unipolarity voltage impulses of varying duration are applied, voltage dividing means connected across said terminals, a first capacitor, a charging circuit connecting said first capacitor to said terminals and having a time constant selected to develop at least a first predetermined voltage level across said first capacitor in response to a voltage impulse of greater than a predetermined duration, means including a first one-way electric valve coupling said first capacitor to a portion of said voltage dividing means to limit the voltage across said first capacitor to a predetermined maximum level and to provide a path for rapidly discharging said first capacitor during gaps between said voltage impulses, a second capacitor, means including a second one-way electric valve coupling said second capacitor to said first capacitor to permit simultaneous charging of said first and second capacitors while preventing discharging of said second capacitor through the discharging path of said first capacitor, and a discharging circuit for said second capacitor having a time constant selected to maintain greater than a second predetermined voltage level across said second capacitor for a predetermined time interval whenever said second capacitor is discharged from said predetermined maximum level during gaps between said voltage impulses.

6. A time interval detecting circuit comprising, input terminals to which substantially constant magnitude unipolarity supply voltage impulses of varying duration are applied, impedance changing means connected to said input terminals to provide a source of reference voltage of substantially the same wave form but having a magnitude less than the magnitude of supply voltage and greater than a first predetermined voltage level, a first capacitor, a charging circuit including a first resistor connecting said first capacitor to said input terminals and having a time constant selected to develop at least said first predetermined voltage level across said first capacitor in response to a supply voltage impulse of greater than a predetermined duration, a discharging circuit including first rectifying means connecting said first capacitor to said source of reference voltage to limit the voltage across said first capacitor to a predetermined maximum level corresponding to the magnitude of said reference voltage and to provide a path for rapidly discharging said first capacitor at the end of each supply voltage impulse, a second capacitor, second rectifying means coupling said second capacitor to said first capacitor to permit simultaneous charging of said first and second capacitors while preventing discharging of said second capacitor through the discharging path of said first capacitor, and a discharging circuit including a second resistor for said second capacitor having a time constant selected to retain greater than a second predetermined voltage level across said second capacitor for a predetermined time interval whenever said second capacitor is discharged from said predetermined maximum voltage level at the end of a supply voltage impulse.

7. A time interval detecting circuit comprising, a pair of input terminals for receiving substantially constant magnitude unipolarity voltage voltage impulses of varying duration, voltage dividing means connected across said terminals, a resistor, a first capacitor connected in series circuit relationship with said resistor across said terminals and responsive to a voltage impulse of greater than a predetermined duration to charge to at least a first predetermined voltage level, a first one-way electric valve coupling said first capacitor to a portion of said voltage dividing means which provides a path for rapidly discharging said first capacitor at the end of each voltage impulse, a second capacitor, means coupling said second capacitor to said first capacitor including a second one-way electric valve arranged to permit simultaneous charging of said first and second capacitors while preventing discharging of said second capacitor through the discharging path of said first capacitor, a discharging circuit for said second capacitor having a time constant selected to retain greater than a second predetermined voltage level across said second capacitor for a predetermined period of time whenever said second capacitor is discharged from said first voltage level at the end of a voltage impulse, and means connected to said second capacitor for initiating an output control signal in response to voltage of at least said first predetermined level and for maintaining the output control signal only in response to voltage greater than said second predetermined level.

8. A time interval detecting circuit comprising, a first pair of input terminals supplied by a source of substantially constant magnitude unipolarity supply voltage impulses of varying duration, a second pair of input terminals supplied by a relatively low impedance source of unipolarity reference voltage impulses having less magnitude but the same wave form as said supply voltage impulses, means interconnecting the negative ones of said first and second pairs of terminals, a resistor having one terminal connected to the positive one of said first pair of input terminals, a capacitor connected in series circuit relationship with said resistor across said first pair of input terminals thereby to charge to at least a predetermined voltage level in response to a supply voltage impulse of greater than a predetermined duration, and rectifying means interconnecting the other terminal of said resistor and the positive one of said second pair of input terminals said rectifying means being poled to limit the maximum voltage level of said capacitor to the magnitude of said reference voltage impulses and to provide a path for rapidly discharging said capacitor through said low impedance source of reference voltage impulses at the end of each voltage impulse.

9. A time interval detecting circuit for producing an output control signal whenever an input unidirectional voltage signal is maintained for at least a predetermined time duration comprising, voltage dividing means supplied by the input signal, an energy storing circuit including a capacitor connected across said voltage dividing means, said capacitor being charged from zero to a predetermined voltage level in response to an input signal of said predetermined duration, rectifying means connected between said capacitor and a tapped portion of said voltage dividing means for limiting the capacitor voltage to a maximum level greater than said predetermined level, said rectifying means and said tapped portion of said voltage dividing means providing a path for rapidly discharging the capacitor at the end of each input signal, and voltage responsive means connected to said capacitor for producing an output control signal in response to capacitor voltage of at least said predetermined level.

10. A time interval detecting circuit comprising, input terminals to which substantially constant magnitude unipolarity supply voltage blocks of varying duration are applied, impedance changing means connected to said input terminals to provide a source of reference voltage of substantially the same wave form but having a magnitude less than the magnitude of supply voltage and greater than a predetermined voltage level, a capacitor, a charging circuit including a resistor connecting said capacitor to said input terminals and having a time constant selected to develop at least said predetermined voltage level across said capacitor in response to a supply voltage block of greater than a predetermined duration, and a discharging circuit including rectifying means connecting said capacitor to said source of reference voltage to limit the voltage across said capacitor to a predetermined maximum level corresponding to the magnitude of said reference voltage and to provide a path for rapidly discharging said capacitor at the end of each supply voltage block.

11. Phase discriminating means for two separate alternating voltages having variable phase relationship with respect to each other comprising, two pairs of rectifying means respectively supplied by said voltages, the rectifying means of each pair being arranged in series circuit opposing relationship, two resistors respectively connected in parallel with the rectifying means of one of said two pairs, and means interconnecting said pairs of rectifying means including an impedance element and a third pair of rectifying means arranged to conduct electric energy during periods determined by the time during which said voltages have corresponding polarities, whereby the period of electric energy conduction through said impedance element indicates the phase relationship between said alternating voltages.

12. Discriminating means comprising, first input terminals to which alternating polarizing voltage impulses are applied, separate input terminals to which alternating operating voltage impulses having variable overlapping relation with respect to said polarizing impulses are applied, a first pair of one-way electric valves arranged in series circuit opposing relationship and connected to said first input terminals, a pair of impedance circuits respectively connected in parallel circuit relationship with the valves of said first pair, a second pair of one-way electric valves arranged in series circuit opposing relationship and connected to said separate input terminals, interconnecting means connected between said first and second pairs of valves and including an impedance element connected between the common electrodes respectively of said first and second pairs of opposing valves, said interconnecting means also including a third pair of one-way electric valves connected between opposite electrodes respectively of said first and second pairs of opposing valves and arranged to permit the transmittal of electric energy through said impedance element whenever a polarizing voltage impulse overlaps an operating voltage impulse of corresponding polarity, and output terminals connected to said impedance element.

13. Phase discriminating means comprising, a first pair of input terminals adapted to be energized by alternating operating voltage, at least one pair of half-wave rectifying elements connected to form a full-wave bridge-type rectifier, means connecting the alternating current terminals of said rectifier to said first input terminals, an additional pair of half-wave rectifying elements serially connected between one of the direct current terminals of said rectifier and the two associated rectifying elements, respectively, said additional rectifying elements respectively being poled in opposition to said associated elements thereby to block the normal flow of current through these associated elements, a pair of shunting circuits respectively connected across said additional rectifying elements, a second pair of input terminals adapted to be energized by alternating reference voltage and connected across said pair of additional rectifying elements for circulating biasing current alternately through said additional elements, and impedance means connected between the direct current terminals of said rectifier, whereby the flow of current from said first input terminals through said impedance means at any instant of time is determined by the relative polarity of said second input terminals at the same instant of time.

14. Discriminating means comprising, a source of alternating operating voltage, at least two half-wave rectifying elements connected in combination with said source of operating voltage to form a full-wave rectifier having a pair of direct current terminals, a pair of unilaterally conductive blocking elements respectively connected in series circuit relationship with the rectifying elements connected to one of the direct current terminals of said full-wave rectifier, a pair of shunting circuits respectively connected across said blocking elements, a source of alternating polarizing voltage coupled to said shunting circuits to render said blocking elements alternately conductive and non-conductive, and impedance means connected across said direct current terminals.

15. In combination; a source of alternating operating voltage; at least two one-way electric valves connected in combination with said source of operating voltage to form a full-wave rectifier having a pair of direct current terminals; a pair of unilaterally conductive blocking elements respectively connected in series circuit relationship with the electric valves connected to one of the direct current terminals of said full-wave rectifier; a pair of shunting circuits respectively connected across said blocking elements; a source of alternating polarizing voltage coupled to said shunting circuits to render said blocking elements alternately conductive and non-conductive; an impedance element connected across said direct current terminals for conducting current whenever the polarity of the operating voltage is appropriate with respect to the polarity of the polarizing voltage; circuit means, including said impedance element, responsive to conduction by said impedance element for providing a source of unipolarity supply voltage impulses, the duration of each impulse corresponding to a period of conduction by said impedance element, and for providing a relatively low impedance source of unipolarity reference voltage impulses having less magnitude but substantially the same wave form as said supply voltage, said supply and reference voltage sources having a common negative terminal; a first resistor; a first capacitor serially connected with said first resistor to said circuit means for charging to a predetermined voltage level by a supply voltage impulse of greater than a predetermined duration, said first capacitor having one terminal connected to said negative terminal; a one-way electric valve connected between the other terminal of said first capacitor and said circuit means for limiting the maximum voltage level of said first capacitor to the magnitude of said reference voltage impulses and to provide a path for rapidly discharging said first capacitor through said relatively low impedance source at the end of each voltage impulse; a second capacitor; another one-way electric valve connected between said first and second capacitors for permitting simultaneous charging of both capacitors while preventing discharging of said second capacitor through the discharge path of said first capacitor; and a second resistor connected across said second capacitor thereby to provide a path for discharging said second capacitor at the end of each voltage impulse.

References Cited in the file of this patent

UNITED STATES PATENTS

| | | |
|---|---|---|
| 2,438,907 | Frankel et al. | Apr. 6, 1948 |
| 2,481,912 | Dorsman | Sept. 13, 1949 |
| 2,507,226 | Siezen | May 9, 1950 |
| 2,545,349 | Foster | Mar. 13, 1951 |
| 2,588,427 | Stringfield | Mar. 11, 1952 |
| 2,771,575 | Hampton | Nov. 20, 1956 |

FOREIGN PATENTS

| | | |
|---|---|---|
| 540,579 | Great Britain | Oct. 22, 1941 |
| 783,304 | Great Britain | Sept. 18, 1957 |